United States Patent [19]
Fuchs

[11] 3,995,092
[45] Nov. 30, 1976

[54] THREADED ROD COMPOSED OF LAMINATED MATERIAL

[75] Inventor: Heinz Fuchs, Embrach, Switzerland

[73] Assignee: Micafil A.G., Zurich, Switzerland

[22] Filed: Oct. 29, 1974

[21] Appl. No.: 519,023

[30] Foreign Application Priority Data
Nov. 16, 1973 Switzerland.................... 16164/73

[52] U.S. Cl............................... 428/400; 485/1 R;
428/364; 428/397
[51] Int. Cl.²...................... D02G 3/00; F16B 27/00
[58] Field of Search .......... 161/172, 175, 177, 181;
428/364, 378, 397, 400; 85/1 R, 43, 46;
52/720, 721, 730

[56] References Cited
UNITED STATES PATENTS

| | | | |
|---|---|---|---|
| 2,184,087 | 12/1939 | Schwarz.............................. | 428/397 |
| 2,531,234 | 11/1950 | Seckel................................. | 428/294 |
| 2,949,054 | 8/1960 | White................................. | 428/397 |
| 3,003,304 | 10/1961 | Rasmussen........................... | 57/157 |
| 3,843,609 | 10/1974 | Kimura et al................... | 428/397 X |

FOREIGN PATENTS OR APPLICATIONS
2,212,762   6/1973   Germany

*Primary Examiner*—Loraine T. Kendell
*Attorney, Agent, or Firm*—Pierce, Scheffler & Parker

[57] ABSTRACT

A laminated threaded rod comprises a number of pressed and glued together laminated sections extending longitudinally of the rod. The laminations of all of the sections extend substantially perpendicularly to the superficies of the rod at least at four different locations on the superficies and which are opposed to each other cross-wise within a cross-sectional plane of the rod. The glued together laminated sections can have various initial cross-sections prior to being machined into rounded threaded form such as triangular or rectangular, and the number of sections can also be varied, there being, for example, four or eight triangular sections or three rectangular sections.

7 Claims, 3 Drawing Figures

THREADED ROD COMPOSED OF LAMINATED MATERIAL

The present invention relates to an improved construction for a threaded rod having high strength and composed of laminated, pressed material, its layers being oriented perpendicularly, or almost perpendicularly relative to at least one portion of the superfices of the rod.

Threaded rods made of laminated, pressed materials, their layers arranged unidirectionally and manufactured usually from a rod composed of laminated, pressed material and possessing a polygonal profile, can be designed as tie links, mounting and/or clamping parts, and have been used heretofore preferably in combination with a nut or other known retaining parts, likewise made of pressed materials, and were often employed whenever there was no need for great tensile strength. The low strength of such connecting parts, where the screw threads especially can break away easily, prevents their use for threaded rods requiring high tensile strength.

In the art of electro-technique connecting parts are being utilized and which are manufactured, for example, by use of plywood or glassfiber-reinforced synthetic resin plastics (GFK), whenever there is a need for non-magnetic and/or electrically insulated linkages of high mechaical strength, such as the tightening of a stack of metal laminations for electric machines, where mechanical stresses, magnetic flux and induced eddy currents will arise. However, structural elements made of such laminated, pressed materials are used also for the construction of chemical equipment and for heat-insulating systems.

The known laminated, pressed materials are manufactured from sheet-like structures which are arranged in the form of continuous layers, impregnated or coated with synthetic materials, such as rolls of material made from organic fibers, mats made from spun glass, paper or cardboard rolls or veneers serving as resin carriers, and which are compressed at high pressure and under the influence of heat, usually in special presses. Synthetic materials, especially thermosetting plastics, such as epoxy resins, but also thermoplastics are used as binding agents. The intermediate products produced by the pressing, such as plates, rods and tubes can be further processed by machining to form heavy-duty parts, such as toothed wheels, since it is well known that laminated, pressed materials, and in particular fiber-reinforced laminated pressed materials, for example, glass-fiber reinforced synthetic resin plastics, will develop along their layer plane excellent mechanical characteristics which include maximum strength factors similar to the characteristics of alloyed steels. Due to the lamination and the structure of the individual resin carriers, the laminated pressed materials have a very pronounced directional dependent characteristic. Especially in the case of glass-fiber-reinforced synthetic resin plastics there is a first disadvantage of poor interlamellar adhesion which affects adversely its bond strength and torsional strength; a second disadvantage is its susceptibility to breaking under bending and tensile stresses, depending on the angle of load. When breaks do occur, they are primarily tension cracks such as matrix cracks and cracks along the boundary resin/-glass layers a well as breaks in fiber structure, caused by local mechanical overstresses.

It is already known from German published patent specification (DT-OS 2,212,762) to manufacture threaded rods, which are flattened on two sides, from one laminated pressed body made from a glass fiber mat or felt wherein said fibers are bonded together by an epoxy resin, where recesses are left open between rod and counterpart within the two opposed zones of the rod profile. At the eliminated segments of the laminated pressed body the pressed layers of the material are parallel to the chord of the segment, and will thus contribute very little at this point to the load transmission. The recesses are provided for the purpose of ensuring a non-destructive disassembly of the threaded rod, even after overloading the rod, and without incurring any significant loss of strength.

The principal object of the invention is to provide a laminated threaded rod having a greater strength than such rods, known heretofore, do possess, and whereby it is especially desired to make possible an advantageous application of force through the screw threads throughout the entire threaded area. Further desirable is a non-destructive disassembly of the connecting and mounting parts, made of laminated, pressed material, even after overstresses suffered by the threaded rod.

These objectives are achieved according to the invention in that the body of laminated pressed material is composed of a multitude of laminated pressed material parts which are glued together, and where their layers extend perpendicularly, or almost perpendicularly to the superfices of the rod at least at four locations of this superficies, which are opposed to each other crosswise within a cross-sectional plane of the rod.

The threaded rod so described avoids, to a very high degree, any stripping or breaking of its screw threads. By the utilization of the full profile area of the rod there is accomplished a substantial increase in strength of the connecting or mounting parts, and especially throughout the entire threaded area. This increase in strength is of such magnitude that in the case of a very high overload of the threaded rod there will occur, more often than not, a break of the rod proper, before any threads will break off due to their stripping or the like. Thus, the operational safety is increased substantially, especially under full load conditions. Also will be avoided in most instances any freezing between the threaded rod and retaining nut, thus ensuring a non-destructive disassembly.

It will be advantageous to combine the parts of the laminated pressed material which are initially in the form of isosceles triangular sections.

Another embodiment of the rod made of laminated pressed material has a centrally located section of initially elongated rectangular configuration where the layers of the laminated pressed material extend from one side of the rod to the other and parallel to a rod diameter, and where on both sides of the center section two or more sections are attached laterally, their layers of laminated pressed material being arranged perpendicularly to the layers of the center section.

A threaded rod thus composed in accordance with the invention makes possible an application of force uniformly throughout the entire circumference of the threaded rod.

Practical embodiments of threaded rods in accordance with the invention will be explained below in detail and are shown in a simplified manner in the accompanying drawings wherein.

Figure 1:
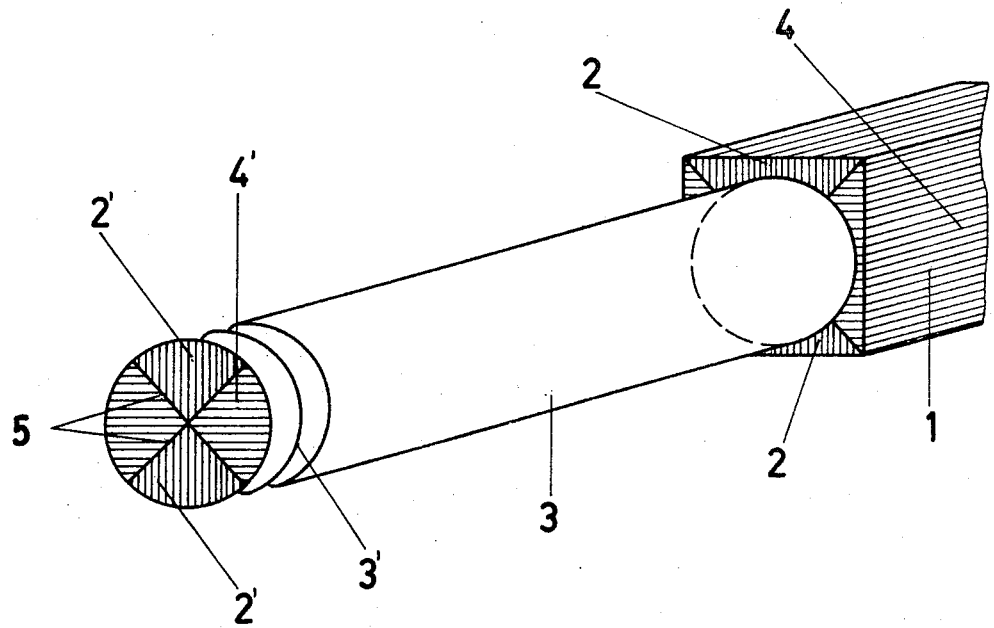
FIG. 1 shows a threaded rod in perspective.

In FIG. 1 the numeral 3 denotes a threaded rod which consists of four parts 2, or 2' respectively, made of laminated pressed material, and assembled in the form of sectors. The parts 2, cut from a plate of laminated pressed material, not illustrated, preferably four sectors each with a contour of a right-angle isosceles triangle, are assembled and glued together to form a square rod 1 of laminated pressed material. The glueing 5 between the sectors 2 is accomplished preferably by use of a synthetic resin, for example, a synthetic resin known under the trade name "Araldit". The latter is a trademark of the Ciba Products Company and identifies epoxy resins more particularly disclosed in a publication of the McGraw-Hill company entitled "Handbook of Epoxy Resins" copyrighted 1967. The part 3 of the rod must then be machined into a round bar to make possible the cutting of the thread. The individual parts of the laminated pressed material 2, 2' are arranged thusly that an optimum utilization of the directional dependence concerning the characteristics of the laminated pressed material will be ensured. This is accomplished in that the compressed material layers 4, 4' of each of the four sectors extend perpendicularly, or almost perpendicularly relative to the superficies of the rounded rod, thereby resulting in a substantially greater strength of the thread portion 3', especially with respect to shear strength within the outer profile zones.

Figures 2, 3:
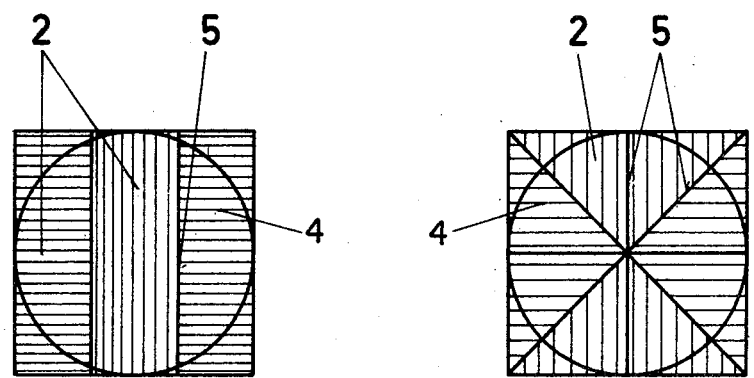
FIG. 2 is a cross section of a rod made of laminated pressed material having a square profile and which consists of eight parts of such material.
FIG. 3 is a cross section of a rod made of laminated pressed material also having a square profile and which consists of three parts of such material.

FIGS. 2 and 3 likewise depict multi-part rods having initially square profiles made from laminated pressed material. The manufacture of these threaded rods is substantially identical with the manufacture of the rod 3–4 described in connection with FIG. 1. However, these embodiments show different arrangements for the several sections which when glued together make up the entire profile for the rod.

In FIG. 2 it will be seen that the desired initially square profile for the rod and which is then machined into rounded form is established by gluing together eight identical laminated sections 2 each of which has the configuration of a right-angle isosceles triangle, the traingles being glued together along adjoining sides and all of the glued-together surfaces extending in a radial direction to the longitudinal axis of the rod. This eight-part construction is advantageous for the production of rods having relatively large diameters.

In FIG. 3 it will be seen that the desired profile for the rod is established by gluing together three laminated sections 2 each of which has an elongated rectangular configuration. The lamination lines of the middle section of the rod all extend from one side of the rod to the other and parallel to a diameter thereof and the lamination lines of the outer sections extend perpendicular to the lamination lines of the middle section. The embodiment of FIG. 3 is more useful for the manufacture of threaded rods having smaller cross section.

The concept of the invention is not limited to the examples shown by the drawings. The manufacture of a threaded rod, illustrated on the basis of an initially square profile of the rod made of laminated pressed material, is also applicable to the production of a rod possessing any polygonal profile, and the individual sections which when glued together establish the profile for the rod, can be placed at a variety of angles relative to the longitudinal rod axis, and can also be arranged in a multitude of combinations relative to each other.

I claim:

1. A round threaded rod which comprises a number of pressed and glued together laminated sections extending longitudinally of the rod, the laminations of all of said sections extending substantially perpendicularly to the superfices of the rod at least at four locations of the superfices, said locations being opposed to each other crosswise within a cross-sectional plane of the rod.

2. A laminated round threaded rod as defined in claim 1 wherein the pressed and glued together laminated sections are constituted by radial sectors of the rod.

3. A laminated round threaded rod as defined in claim 2 wherein the rod is formed by four laminated sections each constitued by a 90° radial sector of the rod.

4. A laminated round threaded rod as defined in claim 1 wherein the pressed and glued together laminated sections each have an initial isosceles triangular cross section which form a rod having an initially square configuration and which is machineable into threaded form.

5. A laminated round threaded rod as defined in claim 4 wherein the side of the initially isosceles triangular sections converge at junction points coinciding with the longitudinal axis of the rod.

6. A laminated round threaded rod as defined in claim 4 and which is constituted by three side-by-side glued together laminated sections, the laminations of the center section extending from one side of the rod to the other parallel to a diameter thereof and the laminations of the two outer sections extending perpendicularly to the laminations of the center section.

7. A laminated round threaded rod as defined in claim 6 and wherein the three side-by-side glued together laminated sections each have an initially elongated rectangular cross section which form a rod having an initially square cross section and which is machineable into rounded threaded form.

* * * * *

UNITED STATES PATENT OFFICE
CERTIFICATE OF CORRECTION

PATENT NO. : 3,995,092
DATED : November 30, 1976
INVENTOR(S) : HEINZ FUCHS

It is certified that error appears in the above-identified patent and that said Letters Patent are hereby corrected as shown below:

Claim 4 - last line before "threaded" insert:

- rounded -

Signed and Sealed this

Eighth Day of February 1977

[SEAL]

Attest:

RUTH C. MASON
*Attesting Officer*

C. MARSHALL DANN
*Commissioner of Patents and Trademarks*